Patented Aug. 7, 1934

1,969,701

UNITED STATES PATENT OFFICE 1,969,701

WATERPROOFING AND TANNING COMPOSITION AND METHOD OF PREPARATION

Frank Berdolt, Walden, N. Y., assignor of one-half to Minnie E. Berdolt, Albany, N. Y.

No Drawing. Application March 7, 1932, Serial No. 597,408

7 Claims. (Cl. 106—23)

My invention relates to a waterproofing and tanning composition and to a method of preparing the same. It is especially useful in retanning leather and making the same waterproof, although the composition made in accordance with my invention may be applied to other surfaces such as those of metal, wood, paper and the like for waterproofing and preserving the same.

In accordance with my invention sulphur is first boiled with water for a desired length of time. The sulphur, preferably pulverized or finely divided, may be mixed with hot water in about the proportions of one part by volume of sulphur to two parts of water. The water is preferably but not necessarily hot because the sulphur mixes more readily therewith. The mixture is then boiled and agitated during the boiling by stirring. While the proportions of sulphur and water may differ from those specified, the quantity of sulphur should be kept sufficiently low to prevent its spattering from the container during the boiling. Additional water, preferably at boiling temperature, is added from time to time as the liquid must not be permitted to evaporate entirely during this operation.

As the boiling step progresses, the color of the sulphur gradually changes. For example, after about five hours the sulphur has a wine-red tint which gradually changes to a dark or substantially black color after about twenty-four hours. Although such extended treatment is not absolutely necessary, I prefer to boil the sulphur until it has taken on a dark color. For the purpose of producing a more violent agitation of the mixture than is possible by the simple process of stirring, I add to the boiling mixture, after the sulphur has acquired a dark color, one teaspoonful of baking powder dissolved in about a pint of water for each five pounds of sulphur being treated. If the baking powder is added before the sulphur has acquired a dark color, it will have no effect or substantially no effect in agitating the mixture.

When the sulphur has been boiled with the water for the desired time all of the water is evaporated, and such evaporation may be promoted by artificial heat, care being taken that the sulphur as such does not come into direct contact with the source of heat.

While it is unnecessary that all of the water should be evaporated from the sulphur mixture, it is highly desirable, and in fact it seems to be necessary that all of the water should be evaporated, when the composition made as hereinafter described, is used as a waterproofing and preserving compound because it mixes better and more quickly with the oil, which is subsequently added, than would otherwise be the case.

The purpose and effect of treating the sulphur by boiling is to produce an incombustible substance when it is mixed with linseed oil. The oil and sulphur, both being readily combustible, a mixture thereof will burn unless the sulphur is preboiled as set forth above. But, when the boiled sulphur is mixed with linseed oil to form a solid or plastic mass, such a mass will merely glow and not burn when highly heated. When cooled it is of a red color, which can be used as a pigment.

After the sulphur has been boiled with water for the desired length of time, it is mixed with an oil, preferably linseed oil, which gives a body to the mixture. I have successively carried out my process by taking one part of sulphur prepared in the manner described above and mixing it with two parts of linseed oil. The mixture is made in any suitable pot or vessel and is heated to boiling temperature in any desired manner. The boiling operation is continued while the mixture is being stirred or otherwise agitated until the oil and sulphur combine. Additional oil, which has preferably been pre-heated to the boiling temperature, may be added during the boiling operation to keep the mixture at the proper consistency. The boiling is continued until it forms a substantially dry mass of elastic sponge-like substance resembling rubber. The material is then removed from the source of heat and taken from the vessel and the elastic sponge-like substance may be used in this form as a substitute for rubber or for other desired purposes.

To prepare a liquid waterproofing composition, however, the substance thus obtained is broken up and again mixed with linseed oil, or it may be melted by the application of heat and then mixed with the oil, and, it may be noted that this elastic substance will merely melt and not burn when held over a flame. The oil and elastic material are mixed in the proportion of about one part of material to two parts of oil and the mixture is then boiled. Additional hot oil may be added as the boiling proceeds. The mixture should be boiled for a period of from 1 to 5 hours, the length of time required for the boiling depending upon the consistency of the mixture that is desired. During the initial stages of the boiling operation the mixture rises. After the mixture stops rising it is boiled slightly until the desired consistency is secured. If the material is to be applied with a brush, the consistency should be relatively thick or heavy, whereas if the material to be treated therewith is to be dipped directly into the mixture the consistency should be relatively light or thin. The composition obtained by the foregoing process may be used either hot or cold for waterproofing any kind of material, and when applied and dried, an elastic surface is produced.

The resulting composition possesses a rather disagreeable odor which may be removed by adding the white of one egg to one quart of the mixture, or, by merely permitting the mixture to cool and reboiling for a short period.

I consider the boiling or steaming of the sulphur, prior to mixing with the oil, as an essential step in my process, because otherwise the desirable results are not attained. The purpose is to produce a substantially incombustible composition of oil and sulphur and hence the boiling may be done in any liquid, other than water, which will produce this result.

While I have described my invention in its preferred embodiment it is to be understood that the words which I have used are words of description rather than of limitation and that changes within the purview of the appended claims may be made without departing from the true scope and spirit of my invention.

What I claim is:

1. The steps in the method of making a rubber substitute which comprises boiling sulphur with water until it darkens in color, thereafter boiling the boiled sulphur with linseed oil until an elastic, sponge-like mass is produced.

2. The method of preparing a liquid waterproofing composition which comprises boiling sulphur in water until it assumes a comparatively dark color, mixing the boiled sulphur with linseed oil, boiling the mixture while agitating until a residual mass of elastic, sponge-like substance is produced, then boiling the residue with additional linseed oil until it has combined with the oil and a liquid product having the desired consistency is produced.

3. The method of preparing a liquid waterproofing composition of the character described which comprises boiling sulphur in water until it darkens in color, mixing about one part of the boiled sulphur with about two parts of linseed oil, boiling the mixture while agitating until a residual mass of elastic, sponge-like substance is produced, then boiling about one part by volume of the residue with about two parts of linseed oil for one hour or more until a liquid product having the desired consistency is produced.

4. The method of preparing a waterproofing composition which comprises boiling sulphur in water until it assumes a comparatively dark color, mixing the boiled sulphur with linseed oil, boiling the mixture while agitating until a residual mass of elastic, sponge-like substance is produced, then boiling the residue with additional linseed oil for one hour or more until a liquid product having the desired consistency is produced, and removing the disagreeable odor from the mixture by the addition of albuminous material.

5. The method of preparing a waterproofing composition which comprises boiling finely divided sulphur with water for a period of from 1 to 24 hours, or more, evaporating the water, then mixing the residue with linseed oil, boiling the mixture while agitating until an elastic mass is produced, then mixing the residue in the proportion of one part to two parts of linseed oil and boiling until the elastic mass has combined with the linseed oil and a liquid product having the desired consistency is secured.

6. The method of preparing a waterproofing composition comprising boiling finely divided sulphur with water until the sulphur assumes a dark color, adding baking powder to promote agitation, evaporating the water from the sulphur, then boiling the residue with linseed oil until an elastic mass is produced, then boiling said mass with linseed oil until it has combined with the linseed oil and until a liquid product having the desired consistency is produced.

7. The method of preparing a waterproofing composition comprising boiling finely divided sulphur with water until the sulphur assumes a dark color, adding baking powder to promote agitation, evaporating the water from the sulphur, then boiling about one part by volume of the residue with about two parts of linseed oil until an elastic sponge-like mass is produced, then boiling about one part of the mass with about two parts of linseed oil for a period of from one to five hours or more until the mass has combined with the oil and until a liquid product having the desired consistency is produced.

FRANK BERDOLT.